H. H. COLBY.
SUBSOIL ATTACHMENT FOR PLOWS.
APPLICATION FILED NOV. 26, 1920.

1,422,418.

Patented July 11, 1922.

Henry H. Colby INVENTOR.

BY

J. Reaney Kelly ATTORNEY.

UNITED STATES PATENT OFFICE.

HENRY H. COLBY, OF TALLULA, ILLINOIS.

SUBSOIL ATTACHMENT FOR PLOWS.

1,422,418.   Specification of Letters Patent.   Patented July 11, 1922.

Application filed November 26, 1920. Serial No. 426,560.

*To all whom it may concern:*

Be it known that I, HENRY H. COLBY, citizen of the United States, residing at Tallula, in the county of Menard and State of Illinois, have invented certain new and useful Improvements in Subsoil Attachments for Plows, of which the following is a specification.

This invention relates to a new and novel subsoil attachment for plows and as its main object contemplates a provision of a subsoil attachment which in addition to lifting the soil forms small furrows beneath the surface thus loosening the soil so that it will retain a greater quantity of moisture.

A further object of the invention is to provide a device of the above character that is simple in construction, strong and durable and which may be manufactured at a low cost.

Various other objects and advantages of my invention will become apparent during the continuance of the following description.

In reducing my invention to practice I first provide a body portion 10 in the form of a share that is constructed of metal and substantially wedge shape when viewed in top plan. The body portion 10 tapers inwardly toward the point 11 and its leading edge is more or less sharp to decrease draft or friction.

Throughout its width and a portion of its length the body 10 is provided with a series of spaced raised portions 12 which are substantially wedge shaped when viewed in top plan and which taper downwardly from their extreme rear end to a point flush with the top face of the body. The raised portions 12 may be formed integral with the body such as by treating the normally flat body with suitable machinery.

Figure 1:
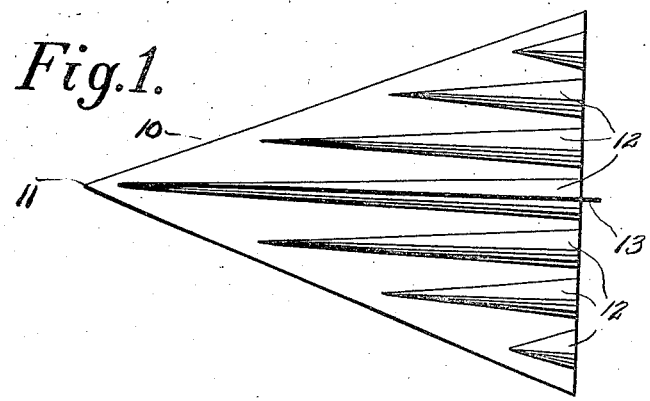
Figure 1 is a view in top plan showing my invention in its preferred embodiment.

Upon reference to Figure 1 it will be observed that the forward end of the raised portions 12 terminates in uniformed spaced relation to the respective leading edges of the body 10 and that they vary in length in order that such positioning may be accomplished. It will be further noticed that the raised portions 12 reach their maximum width and height at the trailing edge of the body so that when the body passes through the soil the raised portions 12 will, in addition to raising the soil, leave a series of furrows beneath the surface so that the soil will retain a greater quantity of moisture.

Figure 2:
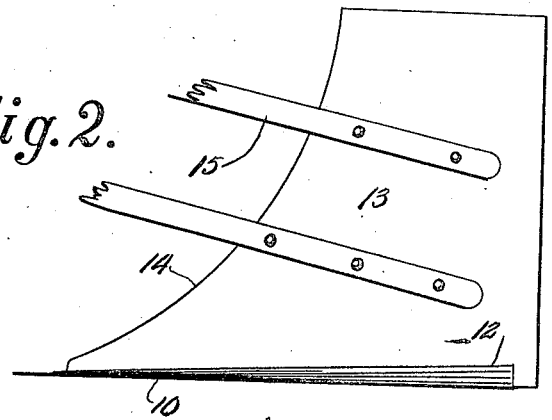
Figure 2 is a view in side elevation.
Figure 3:
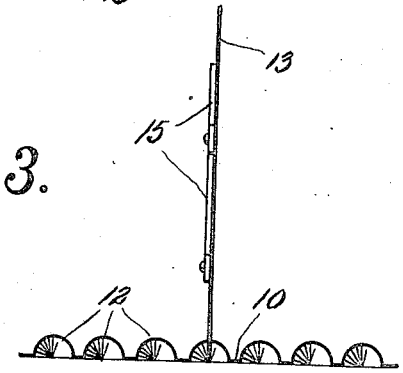
Figure 3 is an end view of my invention looking from the rear.

I further provide a carrying member 13 which is also formed of metal and which is secured at its lower edge to the central longitudinal part of the body 10 slightly spaced from the extreme leading edge thereof. The member 13 also extends slightly beyond the trailing edge of the body 10 as clearly shown in Figure 2. The leading edge of the member 13 is curved rearwardly and upwardly as at 14 in Figure 2 which edge is preferably sharp so as to decrease resistance.

In order to facilitate the connection of the member 13 to a plow beam or the like I have shown the same provided with spaced arms 15. However it is to be understood that other means may be provided for the above purpose should occasion so require.

What is claimed is:

1. A subsoil attachment for plows comprising a blade for loosening the subsoil, means carried by the blade for attachment to the plow, and a plurality of laterally spaced raised portions on the upper face of the blade and extending longitudinally thereof to provide soil lifters, said lifters having their upper soil-engaging surfaces thereof on inclined planes to lift the loose soil upwardly to form moisture-retaining furrows below the ground surface.

2. A subsoil attachment for plows comprising a substantially flat wedge-shaped blade for loosening the subsoil, a series of raised portions formed on said blades and extending longitudinally of the upper face thereof, said portions having rearwardly inclined surfaces for lifting the soil as the blade advances to provide moisture-retaining furrows below the ground surface, and means carried by said blade for attachment to a plow.

3. A subsoil attachment of the character specified comprising a substantially flat blade having its longitudinal edges tapering to a point at its forward end, a carrying member projected upwardly from the central longitudinal part of the blade and a plurality of laterally spaced raised portions extending longitudinally of the blade and on opposite sides of the vertical carrying member, said portions tapering towards their forward ends to a point flush with the upper surface of the blade and in spaced relation to the leading edges of the latter, the upper surface of each portion being on a rearwardly inclined plane for lifting and depositing the subsoil rearwardly of the advancing blade to form moisture-retaining furrows below the surface of the ground.

In testimony whereof I affix my signature in presence of two witnesses.

HENRY H. COLBY.

Witnesses:
C. E. GREENE,
C. FORD MATHEW.